United States Patent

Dill et al.

[15] 3,640,243
[45] Feb. 8, 1972

[54] MACHINE FOR MANUFACTURING A NOVELTY ICE CREAM PRODUCT

[72] Inventors: Harry L. Dill; Richard D. Collins, both of Baltimore, Md.

[73] Assignee: Maryland Cup Corporation, Owings Mills, Md.

[22] Filed: Aug. 12, 1970

[21] Appl. No.: 63,109

[52] U.S. Cl. ................................................................118/24
[51] Int. Cl. .............................................................B05c 5/00
[58] Field of Search ..........................118/13, 24, 25, 26, 30; 107/8 A

[56] References Cited

UNITED STATES PATENTS

| | | |
|---|---|---|
| 2,769,423 | 11/1956 | Landgraber ........................118/25 |
| 3,129,114 | 4/1964 | Kindman ............................118/24 |
| 3,136,660 | 6/1964 | Mueller .............................118/24 |

Primary Examiner—Henry S. Jaudon
Attorney—Birch and Birch

[57] ABSTRACT

A machine for manufacturing ice cream cones having a coating material, such as chocolate and a particulate confectionary material such as crushed nuts, comprises a conveyor for linearly conveying the ice cream cones in upside down position. A tank for holding a coating material such as melted chocolate, is mounted below the conveyor for oscillation vertically relative to the path of travel of ice cream cones. The coating material in the tank contacts the exposed surfaces of the ice cream on each cycle of oscillation. A chamber is mounted for cooscillation with the tank for cyclically enclosing the coated ice cream balls of the ice cream cones. Means are provided for aspirating within the chamber particulate confectionary material, such as crushed nuts, against the coated surfaces of the ice cream cones.

10 Claims, 11 Drawing Figures

INVENTORS
HARRY L. DILL
RICHARD D. COLLINS

BY *Albert J. Kramer*

ATTORNEY

INVENTORS
HARRY L. DILL
RICHARD D. COLLINS

BY *Albert J. Kramer*

ATTORNEY

INVENTORS
HARRY L. DILL
RICHARD D. COLLINS

BY *Albert J. Kramer*
ATTORNEY

MACHINE FOR MANUFACTURING A NOVELTY ICE CREAM PRODUCT

This invention relates to food processing machinery and it is more particularly concerned with a machine for manufacturing novelty ice cream products.

A popular form of novelty ice cream developed in recent years comprises an ordinary edible cone filled with ice cream. The exposed surfaces of the ice cream at the top of the cone are coated with chocolate or other confectionary material and sprinkled with crushed nuts.

Conventional means for manufacturing such products do not produce a uniform product, are difficult to use and are somewhat unreliable.

The general object of this invention is the provision of a machine and method of producing such novelty products which result in the production of uniform products.

Another object is the provision of a machine of the type mentioned which is reliable in use, positive in operation and which is sturdy in construction.

A further object is the provision of a machine of the type mentioned having a novel means for applying crushed nuts to the product.

These and still further objects, features and advantages of the invention will be apparent from the following description considered together with the accompanying drawing.

In the drawing:

FIG. 11 is a longitudinal sectional view of the confectionary product produced by the embodiment.

Figures 1, 8:
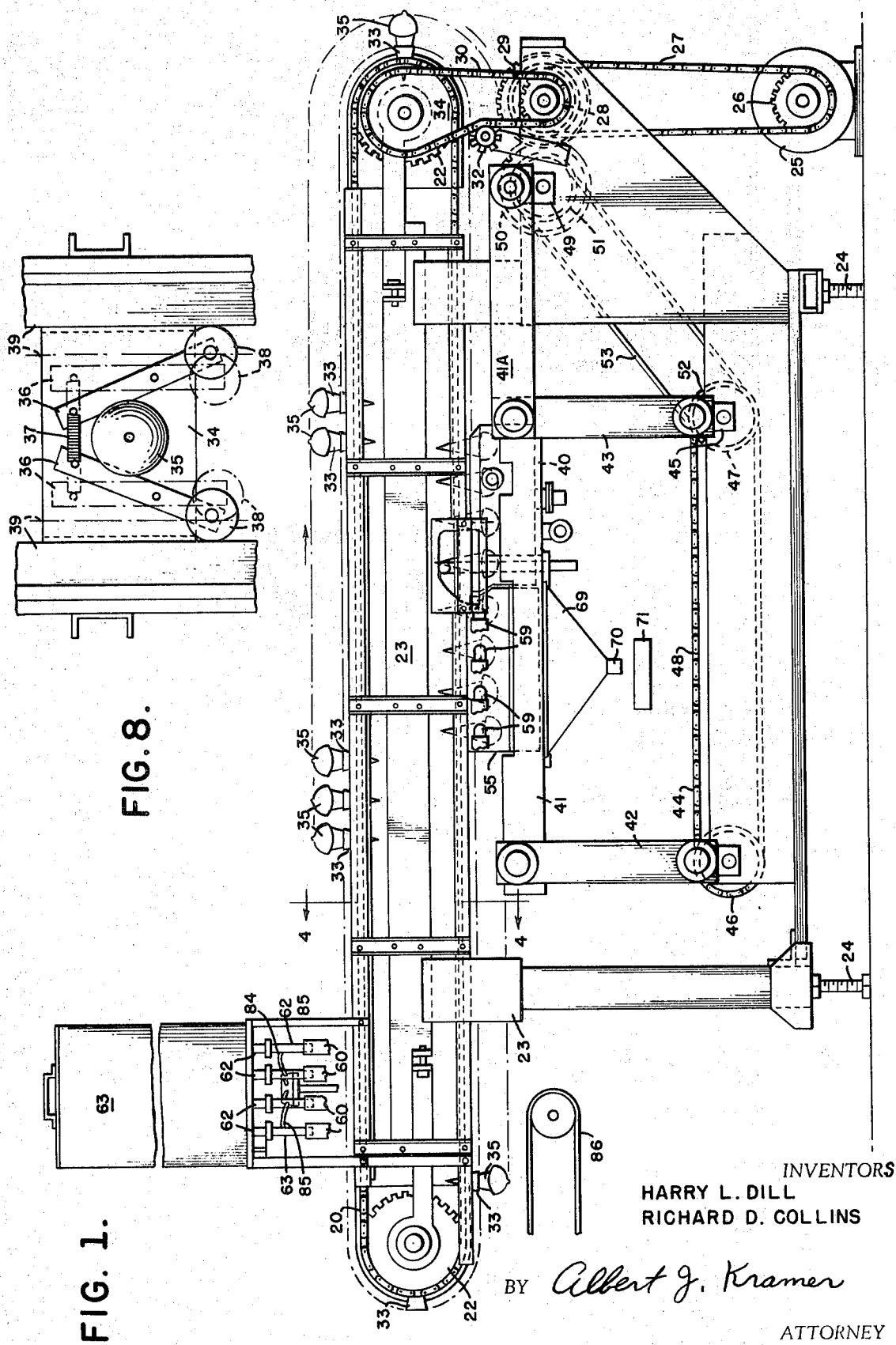
FIG. 1 is a side elevational view of an embodiment of the invention, partly broken away.
FIG. 8 is a sectional view along the line 8—8 of FIG. 6.

Referring with more particularity to the drawing the embodiment illustrated comprises a conventional type of ice cream cone conveyor which has a pair of laterally spaced endless chains 20, 20 supported on vertical sprockets 21, 21 and 22, 22 mounted on the frame structure 23 of the device. The frame structure is supported on suitable legs 24.

The conveyor is driven by an electric motor 25 connected to one of the sprockets 22 by a power train which includes motor takeoff sprockets 26, chain 27, sprockets 28 and 29 mounted on the frame 23, chain 30 and drive sprocket 31 secured for rotation with the sprocket 22. A conventional idling sprocket 32 is also mounted on the frame to hold the chain 30 taut.

A series of truncated V-shaped pocket members 33 are mounted on plates 34 which are disposed between and connected to links of the chains 20, 20 to move therewith. The members 33 are adapted to seat cones of ice cream 35 which are manually placed therein by the operator of the machine.

The ice cream cones are secured in the pocket members each by a pair of coacting fingers 36, 36 pivotally mounted on the bottom of each plate 34 and biased to engage the sides of the cones 35 by coil spring 37 at one end. The opposite ends of the fingers 36, 36 carry rollers 38, 38 which ride against rails 39, 39, respectively. These rails are differently spaced relative to each other at different positions. Where it is desired to have the fingers 36, 36 engage the sides of the cones 35 and retain them in the pocket members 33 the rails are spaced relatively wide as shown by the full lines in FIG. 8; where it is desired to release the cones and permit them to be placed or discharged from the conveyor the rails are spaced relatively narrow which causes the fingers to pivot outwardly against the action of the spring 37 as shown by the broken lines in FIG. 8.

The cones of ice cream 35 are placed in the pocket members 33 on the top side of the conveyor where the rails 39, 39 are spaced relatively narrow. Before they reach the end of the conveyor, the rails are spaced relatively wide to permit the fingers to move against the cones under the action of the spring 37 and to hold them securely in the pocket members. The cones thus held in the pocket members travel with the conveyor around the end and along the bottom of the conveyor in which position they are upside down. In this position, ice cream portions of the cones are first dipped in a pool of melted chocolate or other fluid confectionary products and then crushed nuts are sprinkled onto the coated ice cream.

The pool of melted chocolate is contained in a tank 40 supported on a horizontal beam 41 on either side of the conveyor. Each beam 41 is supported by a pair of vertical links 42, 43 pivotally connected to the upper ends of the links. The lower ends of the links are pivotally connected to eccentric arms 44 and 45 connected for rotation with sprockets 46 and 47, respectively. These sprockets are rotatably mounted on the frame structure of the machine and they are connected for coaction by a sprocket chain 48.

A link 41A extends from one of the beams 41 and is pivotally connected to an eccentric arm 49 mounted for rotation with another sprocket 50 which is meshed with the sprockets 29 and hence receives power from the same motor 25 which powers the conveyor.

The sprockets 47 is geared to the sprocket 50 by means of sprockets 51, 52 and a chain 53.

Figure 2:
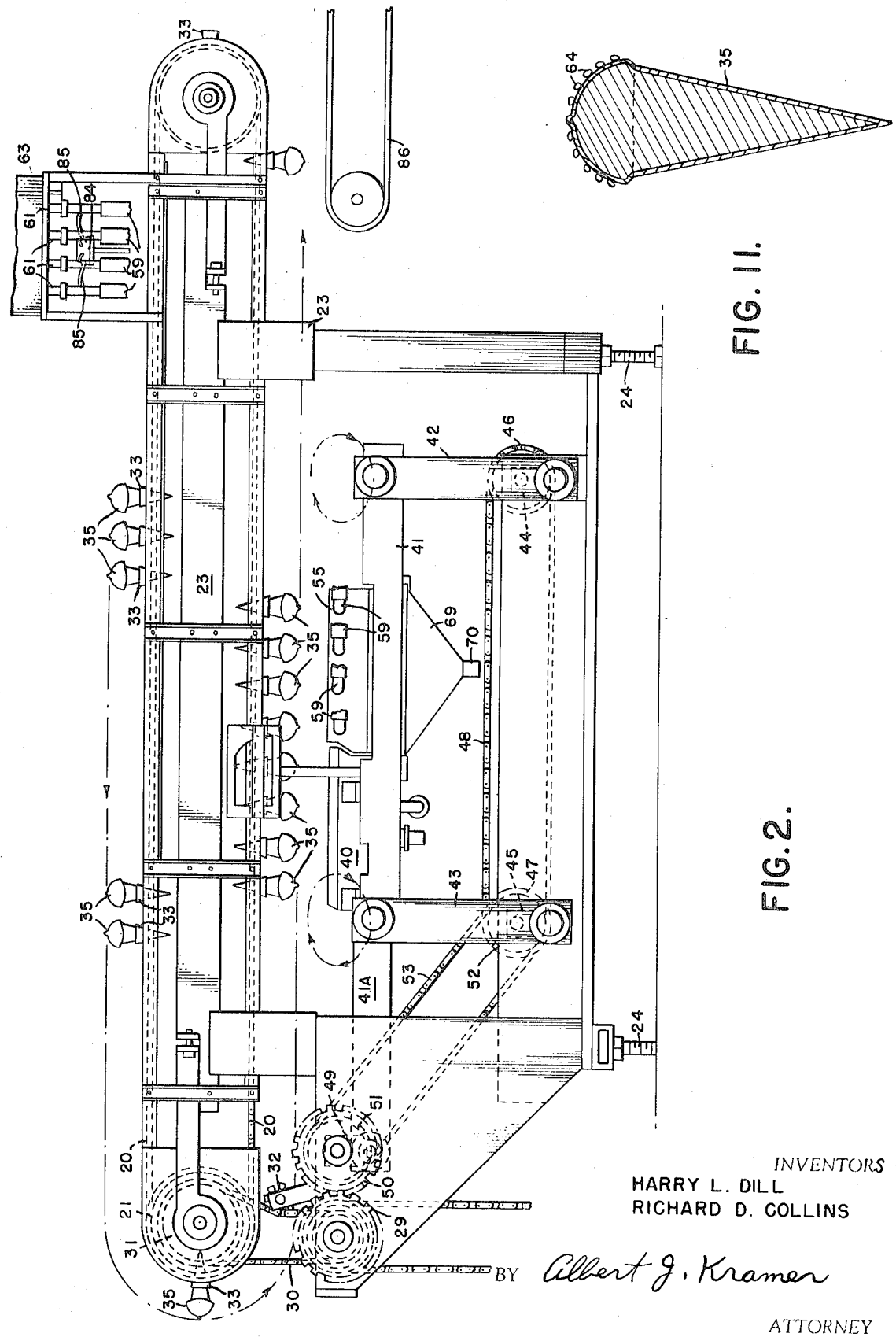
FIG. 2 is an elevational view of the same embodiment on the side opposite that of FIG. 1, partly broken away.
Figure 3:
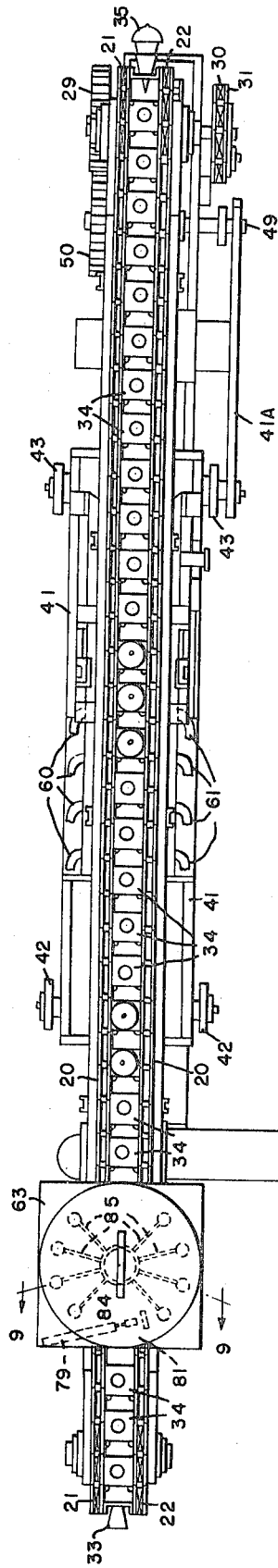
FIG. 3 is a top plan view of the embodiment.
Figure 5:
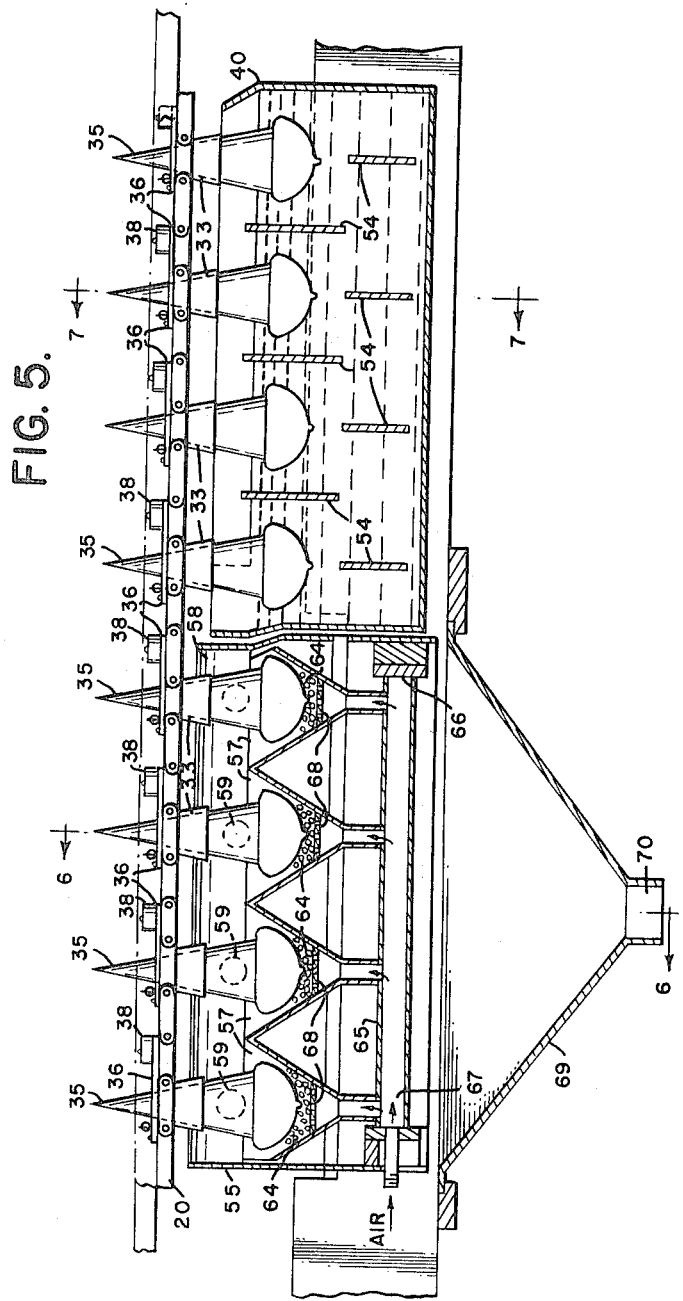
FIG. 5 is a vertical sectional view of a portion of the embodiment at the chocolate dipping and crushed nut application stations.

By these means the tank 40 oscillates between a lower position as shown in FIG. 2 and an upper position as shown in FIG. 1. In the upper position the melted chocolate in the tank 40 contacts the surfaces of the ice cream balls of a group of ice cream cones, say four. Each cycle of oscillation of the beam 41 is sufficiently long to permit a series of four ice cream cones on the conveyor to pass a given fixed point. The tank 40 is provided with baffles 54 to dampen movement of the liquid and prevent it from splashing unduly.

Figure 6:
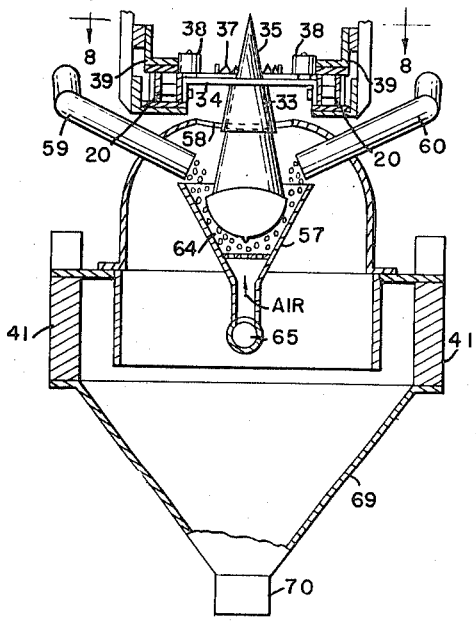
FIG. 6 is a sectional view along the line 6—6 of FIG. 5.

The cones thus dipped in the melted chocolate then pass to the crushed nut applicator station which comprises a chamber 55 mounted on the beams 41 adjacent the tank 40. The chamber 55 contains a series of funnels 57, one for each one, and corresponding to number to the cones which can be accommodated on one dipping in the tank 40. The chamber 55 extends above the funnels 57 and has a longitudinal opening 58 through which the cones are inserted and removed from the funnels as shown in FIG. 6. A pair of flexible tubes 59 and 60 are disposed through opposite sidewalls of the chamber 55 for each funnel. These tubes are connected to outlet pipes 61 and 62 of a crushed nut bin 63. Crushed nuts 64 in the bin 63 are fed through the pipes 61 and 62 by air assisted gravity to the pipes 59 and 60. The lower ends of the funnels 57 are connected to a longitudinal air manifold 65. One end 66 of the manifold is closed while the other end 67 is connected to a source of air under pressure. Each funnel 57 is provided with a screen 68 just above the neck to support a bed of the crushed nuts. The bottom of the chamber 55 is open and communicates with a longitudinal hopper 69 mounted on the bottom of the beams 41. By these means crushed nuts 64 are fed from the bin 63 through the tubes 59 and 60 into the funnels 57. Air directed into the manifold 65 causes each bed of nuts to move upward against the surface of the ice cream. This provides a uniform distribution of the crushed nuts on the surface of the ice cream of the ice cream cones. Any excess nuts which are spilled over the top of the funnels 57 fall by gravity into the hopper 69 and through a drain pipe 70 into a portable receptacle 71 which is periodically returned to the bin 63.

The outlet pipes 61 and 62 are connected to apertures 72 and 73 in the circular bottom wall 74 of the bin 63. Overlying the wall 74 is a plate 75 rotatably mounted by a pivot pin 76. The plate 75 has a series of apertures 77 and 78 corresponding to the apertures 72 and 73 and which are adapted to register with the apertures 72 and 73, respectively, in one position of rotation. The plate 75 is rocked between such a position of registry and a position of nonregistry be means of an air motor 79 mounted on a bracket 80 of the bin 63. The extension arm 81 of the air motor is connected to a bracket 82 which passes through a slot 83 in the bottom wall of the bin and is eccentrically secured to the rotatable plate 75.

Figure 9:
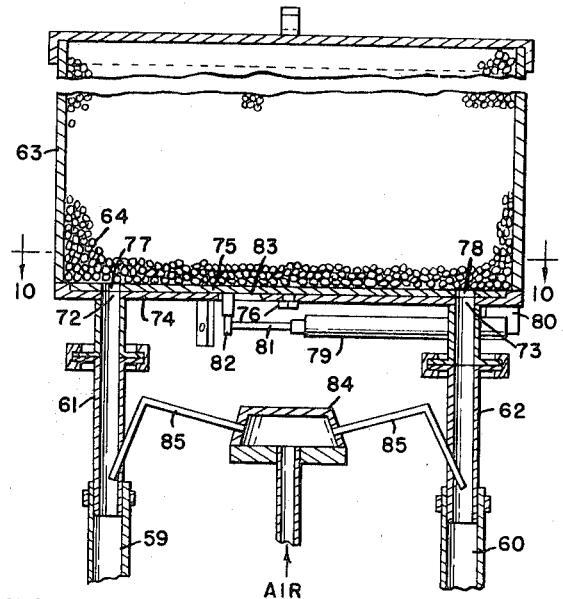
FIG. 9 is a sectional view along the line 9—9 of FIG. 3.
Figure 7:
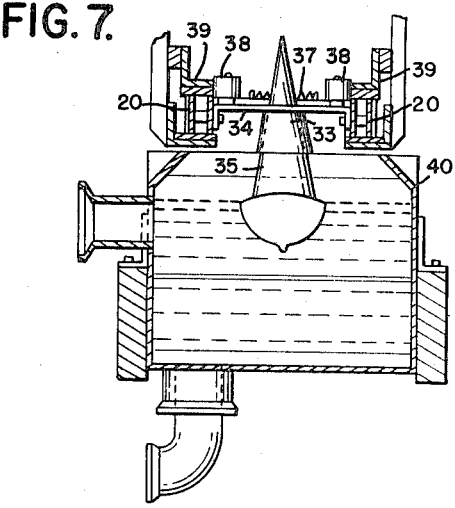
FIG. 7 is a sectional view along the line 7—7 of FIG. 5.
Figure 10:
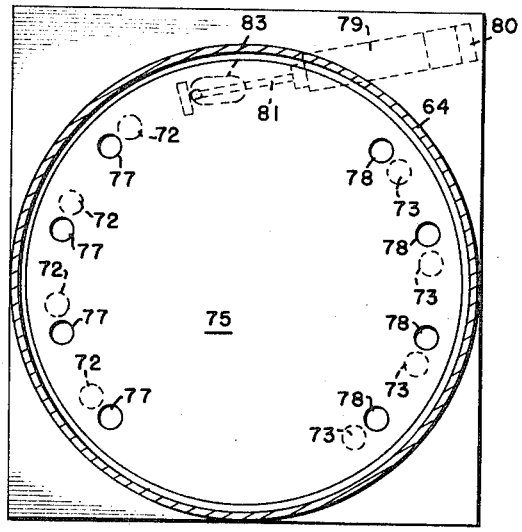
FIG. 10 is a sectional view along the line 10—10 of FIG. 9.
Figure 4:
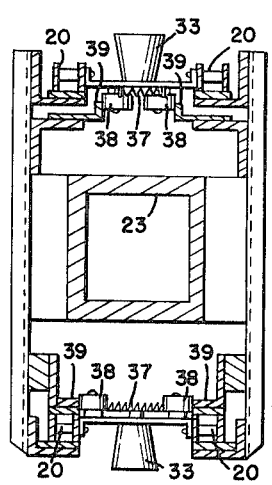
FIG. 4 is a sectional view along the line 4—4 of FIG. 1.

By these means, the plate 75 is oscillated periodically to bring the apertures 77, 78 and 72, 73 into registry and thereby release a quantity of crushed nuts 64 from the bin. The crushed nuts are conveyed through the pipes 61 and 62 and through the tubes 59 and 60 by gravity assisted by a gentle stream of air under pressure from a manifold 84 by feeder tubes 85 which extend from the manifold through the walls of the pipes as shown in FIG. 9.

The completed product is discharged from the conveyor by opening the fingers 36, 36 whereupon it falls onto a discharge conveyor 86 below.

We claim:

1. A machine for coating balls of ice cream on ice cream cones with a fluid coating material and particulate confectionary materials comprising a conveyor for conveying the ice cream cones upside down, a tank for holding a fluid coating material mounted below the conveyor for oscillation vertically relative to the path of travel of the ice cream cones on the conveyor so as to contact the exposed surfaces of the balls of ice cream with fluid coating material in the tank on each cycle of oscillation, a chamber mounted for cooscillation with the tank for cyclically enclosing the coated ice cream balls of the ice cream cones and means for entraining the particulate confectionary material in a stream of air and directing it against the coated surfaces of the ice cream cones in the chamber.

2. A machine as defined by claim 1 in which the coated material is melted chocolate and the particulate confectionary material is crushed nuts.

3. A machine as defined by claim 1 and baffles in the tank to dampen the movement of the coating material.

4. A machine as defined by claim 1 and a bin for holding the particulate confectionary material prior to air entrainment.

5. A machine as defined by claim 4 in which the bin has a circular bottom wall, said wall having apertures therethrough, a circular plate rotatably surmounting the bottom wall, said circular plate having apertures corresponding to the apertures in the bottom wall and registerable therewith in one position relative thereto, means for oscillating said plate to register and disregister said corresponding apertures, and tubes connected to the bottom wall communicating with said openings and with the interior of the chamber.

6. A machine as defined by claim 1 in which the chamber contains a series of funnels in each of which an ice cream cone is held for application of particulate confectionary material.

7. A machine as defined by claim 6 and means for dropping the particulate material into the funnel and for directing a stream of air upwardly through the neck of the funnel.

8. A machine as defined by claim 7 in which a screen is provided in the funnel above the neck for supporting particulate confectionary material.

9. A machine as defined by claim 7 in which the neck of the funnels are connected to an air intake manifold.

10. A machine as defined by claim 7 in which a hopper is provided at the bottom of the chamber for catching particulate confectionary material which spills over the funnels.

* * * * *